United States Patent
Kang et al.

(10) Patent No.: US 10,937,417 B2
(45) Date of Patent: Mar. 2, 2021

(54) SYSTEMS AND METHODS FOR AUTOMATICALLY CATEGORIZING UNSTRUCTURED DATA AND IMPROVING A MACHINE LEARNING-BASED DIALOGUE SYSTEM

(71) Applicant: Clinc, Inc., Ann Arbor, MI (US)

(72) Inventors: Yiping Kang, Ann Arbor, MI (US); Michael A. Laurenzano, Ann Arbor, MI (US); Johann Hauswald, Ann Arbor, MI (US); Lingjia Tang, Ann Arbor, MI (US); Jason Mars, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 16/876,198

(22) Filed: May 18, 2020

(65) Prior Publication Data

US 2020/0380964 A1 Dec. 3, 2020

Related U.S. Application Data

(60) Provisional application No. 62/855,263, filed on May 31, 2019.

(51) Int. Cl.
| | |
|---|---|
| *G10L 15/18* | (2013.01) |
| *G06N 20/00* | (2019.01) |
| *G10L 15/22* | (2006.01) |
| *G10L 15/04* | (2013.01) |
| *G06N 5/04* | (2006.01) |

(52) U.S. Cl.
CPC ............ *G10L 15/1815* (2013.01); *G06N 5/04* (2013.01); *G06N 20/00* (2019.01); *G10L 15/04* (2013.01);
(Continued)

(58) Field of Classification Search
CPC ... G10L 15/22; G10L 15/04; G10L 2015/223; G10L 15/063; G10L 13/027;
(Continued)

(56) References Cited

U.S. PATENT DOCUMENTS 7,827,125 B1 * 11/2010 Rennison ............ G06F 16/3335
706/14
9,489,625 B2 * 11/2016 Kalns ..................... G06N 5/02
(Continued)

OTHER PUBLICATIONS

Arora ("A simple But-Tough-To-Beat Baseline for Sentence Embeddings", Published at OpenView, 2016).*

*Primary Examiner* — Abdelali Serrou
(74) *Attorney, Agent, or Firm* — Padowithz Alce

(57) ABSTRACT

Systems and methods for building a response for a machine learning-based dialogue agent includes implementing machine learning classifiers that predict slot segments of the utterance data based on an input of the utterance data; predict a slot classification label for each of the slot segments of the utterance data; computing a semantic vector value for each of the slot segments of the utterance data; assessing the semantic vector value of the slot segments of the utterance data against a multi-dimensional vector space of structured categories of dialogue, wherein the assessment includes: for each of a distinct structured categories of dialogue computing a similarity metric value; selecting one structured category of dialogue from the distinct structured categories of dialogue based on the computed similarity metric value for each of distinct structured categories; and producing a response to the utterance data.

15 Claims, 7 Drawing Sheets

(52) U.S. Cl.
CPC ........ *G10L 15/22* (2013.01); *G10L 2015/223* (2013.01)

(58) Field of Classification Search
CPC ..... G10L 13/086; G10L 15/142; G10L 15/16; G10L 15/265; G10L 13/00; G10L 15/14; G10L 15/1815; G10L 13/043; G10L 15/1822; G10L 25/30; G10L 25/51; G06N 5/04; G06N 20/00; G06N 3/006; G06N 3/08; G06N 20/10; G06N 3/0427; G06N 3/0445; G06N 3/0454; G06N 5/041; G06F 40/30; G06F 16/90335; G06F 40/211; G06F 40/58; G06F 16/3329; G06F 16/634; G06F 40/20; G06F 16/2457; G06F 17/16; G06F 40/284; G06F 40/289; G06F 40/40
See application file for complete search history.

(56) References Cited

U.S. PATENT DOCUMENTS

| | | | |
|---|---|---|---|
| 9,805,371 B1* | 10/2017 | Sapoznik | G06F 40/216 |
| 10,713,716 B2* | 7/2020 | Mahapatra | G06F 16/9535 |
| 10,803,057 B1* | 10/2020 | Goodsitt | G06F 16/35 |
| 2007/0263823 A1* | 11/2007 | Jalava | H04M 3/568 |
| | | | 379/202.01 |
| 2009/0055165 A1* | 2/2009 | Jindal | G06F 40/56 |
| | | | 704/9 |
| 2012/0005148 A1* | 1/2012 | Horvitz | G06N 20/00 |
| | | | 706/50 |
| 2015/0052084 A1* | 2/2015 | Kolluru | G06T 13/40 |
| | | | 706/11 |
| 2017/0357716 A1* | 12/2017 | Bellegarda | G06F 3/16 |
| 2018/0013699 A1* | 1/2018 | Sapoznik | H04M 3/42382 |
| 2018/0082197 A1* | 3/2018 | Aravamudan | G06N 5/04 |
| 2018/0166077 A1* | 6/2018 | Yamaguchi | G10L 15/22 |
| 2018/0233143 A1* | 8/2018 | Papangelis | G06F 16/3329 |
| 2018/0246973 A1* | 8/2018 | Zhao | G06F 16/9535 |
| 2018/0253734 A1* | 9/2018 | Henry | G06Q 30/0631 |
| 2018/0329982 A1* | 11/2018 | Patel | G06F 16/3322 |
| 2019/0042933 A1* | 2/2019 | Powell | G06N 20/00 |
| 2019/0095464 A1* | 3/2019 | Xie | G06K 9/6272 |
| 2019/0139563 A1* | 5/2019 | Chen | G10L 25/30 |
| 2019/0197107 A1* | 6/2019 | Lin | G06Q 10/107 |
| 2019/0258719 A1* | 8/2019 | Baker | G06F 40/53 |
| 2019/0266283 A1* | 8/2019 | Shukla | G06F 16/9535 |
| 2019/0287030 A1* | 9/2019 | Varughese | G06F 16/285 |
| 2019/0295546 A1* | 9/2019 | Sugiyama | G10L 15/1815 |
| 2020/0097563 A1* | 3/2020 | Alexander | G06F 16/3347 |

* cited by examiner

Identifying User Input Data S210

Converting Utterance Input S215

Identifying Segment Data and Extraction S220

Computing a Vector for a Target Segment S230

Assessing a Target Vector in High Dimensional Space S240

Computing Similarity Metrics S250

Mapping a Target Segment to a Structured Category S260

FIGURE 2

SYSTEMS AND METHODS FOR AUTOMATICALLY CATEGORIZING UNSTRUCTURED DATA AND IMPROVING A MACHINE LEARNING-BASED DIALOGUE SYSTEM

CROSS-REFERENCE TO RELATED APPLICATIONS

This application claims the benefit of U.S. Provisional Application No. 62/855,263, filed 31 May 2019, which is incorporated in its entirety by this reference.

GOVERNMENT RIGHTS

The subject matter of the invention may be subject to U.S. Government Rights under National Science Foundation grants: NSF SBIR Phase 1 Grant—1622049 and NSF SBIR Phase 2 Grant—1738441.

TECHNICAL FIELD

The inventions herein relate generally to the machine learning and artificially intelligent dialogue systems fields, and more specifically to a new and useful system and method for intelligently classifying unstructured data into a machine learning-based conversational service in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for categorizing user input and generating responses to users may not fully satisfy queries and commands posed by a user for which there are no predetermined rules to provide a meaningful response or result to the user.

Therefore, there is a need in the machine learning field and virtual dialogue service fields for systems and methods that enable intelligent techniques for categorizing unstructured data to structured categories of a machine learning-based dialogue service. The embodiments of the present application described herein provide technical solutions that address, at least, the need described above, as well as the deficiencies of the state of the art described throughout the present application.

SUMMARY OF THE INVENTION(S)

In one embodiment, a method for mapping unstructured data of an utterance to one of a plurality of distinct categories includes identifying utterance data comprising a verbal communication and/or a textual communication to a machine learning-based dialogue agent; implementing one or more machine learning classifiers that: (i) predict one or more slot segments of the utterance data based on an input of the utterance data; (ii) predict a slot classification label for each of the one or more slot segments of the utterance data; computing a semantic vector value for each of the one or more slot segments of the utterance data; assessing the semantic vector value of the one or more slot segments of the utterance data against a multi-dimensional vector space of structured categories of dialogue, wherein the assessment includes: for each of a plurality of distinct structured categories of dialogue of the multi-dimensional vector space, computing a similarity metric value, wherein the similarity metric value indicates a degree of similarity of the utterance data to a given structured category of dialogue of the multi-dimensional vector space; selecting one structured category of dialogue from the plurality of distinct structured categories of dialogue based on the computed similarity metric value for each of the plurality of distinct structured categories of dialogue of the multi-dimensional vector space; and producing a response to the utterance data that is communicated via the machine learning-based dialogue agent based at least on the selected one structured category of dialogue.

In one embodiment, the multi-dimensional vector space of structured categories of dialogue includes a distinct category vector value for each of the plurality of distinct structured categories of dialogue.

In one embodiment, computing the semantic vector value for each of the one or more slot segments of the utterance data includes: applying a trained universal sentence encoder that averages word embeddings of each of the one or more slot segments and passes the averages through a feedforward network.

In one embodiment, computing the semantic vector value for each of the one or more slot segments of the utterance data includes: applying a smooth inverse frequency that computes a weighted average of word embeddings of each of the one or more slot segments.

In one embodiment, computing the semantic vector value for each of the one or more slot segments of the utterance data includes: computing an unweighted average of word embeddings for each of the one or more slot segments.

In one embodiment, assessing the semantic vector value for each of the one or more slot segments of utterance data includes: superimposing a mapping of the semantic vector value for each of the one or more slot segments of the utterance data onto a mapping of the multi-dimensional vector space for structured categories of dialogue.

In one embodiment, assessing the semantic vector value for each of the one or more slot segments of utterance data includes: superimposing the semantic vector value for each of the one or more slot segments of the utterance data onto a mapping of the multi-dimensional vector space for structured categories of dialogue.

In one embodiment, computing the similarity metric value includes: computing a proximity value between the semantic vector value for each of the one or more slot segments of the utterance data and each distinct category vector value for each of a plurality of distinct categories of dialogue within the multi-dimensional vector space for structured categories of dialogue.

In one embodiment, computing the proximity value includes: calculating a difference between the semantic vector value and the distinct category vector value.

In one embodiment, selecting the one structured category of dialogue from the plurality of distinct structured categories of dialogue includes: identifying the one structured category having the computed similarity metric value that includes a smallest difference between the semantic vector value and the distinct category value.

In one embodiment, computing the similarity metric value includes: defining a plurality of distinct pairwise of vector values, wherein each of the plurality of distinct pairwise of vector values includes a pairing between (a) the semantic value for each of the one or more slot segments of the utterance data and (b) the distinct category vector value of each one of the plurality of distinct structured categories of dialogue within the multi-dimensional vector space for structured categories of dialogue; and calculating a difference in vector values within each of the plurality of distinct pairwise of vector values, wherein the similarity metric value of the utterance data comprises the difference.

In one embodiment, selecting the one structured category of dialogue from the plurality of distinct structured categories of dialogue includes: identifying the one structured category having the computed similarity metric value that includes a smallest difference in vector values in a given pairwise of vector values.

In one embodiment, each of the plurality of distinct structured categories of dialogue of the multi-dimensional vector space includes: (a) a distinct top-level category of dialogue having a top-level vector value; and (b) one or more distinct sub-categories of dialogue having one or more sub-category vector values, wherein the one or more sub-categories are subordinate to the top-level category and define categories of dialogue with a narrower scope than the distinct top-level category of dialogue.

In one embodiment, assessing the semantic value of the one or more slot segments of the utterance data includes: (a) evaluating the semantic vector value of the one or more slot segments of the utterance data against each distinct top-level category of dialogue of each of the plurality of distinct categories of dialogue; (b) evaluating the semantic vector value of the one or more slot segments of the utterance data against each of the one or more distinct sub-categories of dialogue; and (c) computing the similarity metric value is based at least on the evaluation of the semantic vector value of the one or more slot segments of the utterance data against both of each distinct top-level category of dialogue and each of the one or more distinct sub-categories of dialogue.

In one embodiment, computing the similarity metric value includes: computing a top-level similarity metric value for a given distinct top-level category of dialogue of one of the plurality of distinct categories of dialogue; computing a sub-category similarity metric value for each of one or more distinct sub-categories subordinated to the given distinct top-level category of dialogue; and computing an average similarity metric value that includes: summing the top-level similarity metric value and the sub-category similarity metric value for each of the one or more distinct sub-categories; and dividing the summation based on a number of metric values composing the summation; and the similarity metric value for a given one of the plurality of distinct categories of dialogue comprises the average similarity metric value.

In one embodiment, the multi-dimensional vector space of structured categories of dialogue includes: a plurality of distinct hierarchical categories of dialogue, wherein: each of the plurality of distinct hierarchical categories of dialogue is defined by a distinct top-level category of dialogue and a plurality of distinct sub-categories of dialogue; and a scope of the distinct top-level category of dialogue includes each of the plurality of distinct sub-categories of dialogue; and each of the plurality of distinct sub-categories of dialogue is subordinated to and defines a part of the scope of the distinct top-level category of dialogue.

In one embodiment, a system for mapping unstructured data of an utterance to one of a plurality of distinct categories, the system comprising: a machine learning-based automated dialogue service implemented by one or more hardware computing servers that: identify utterance data comprising a verbal communication and/or a textual communication to a machine learning-based dialogue agent; implement one or more machine learning classifiers that: (i) predict one or more slot segments of the utterance data based on an input of the utterance data; (ii) predict a slot classification label for each of the one or more slot segments of the utterance data; compute a semantic vector value for each of the one or more slot segments of the utterance data; assess the semantic vector value of the one or more slot segments of the utterance data against a multi-dimensional vector space of structured categories of dialogue, wherein the assessment includes: for each of a plurality of distinct structured categories of dialogue of the multi-dimensional vector space, computing a similarity metric value, wherein the similarity metric value indicates a degree of similarity of the utterance data to a given structured category of dialogue of the multi-dimensional vector space; select one structured category of dialogue from the plurality of distinct structured categories of dialogue based on the computed similarity metric value for each of the plurality of distinct structured categories of dialogue of the multi-dimensional vector space; and produce a response to the utterance data that is communicated via the machine learning-based dialogue agent based at least on the selected one structured category of dialogue.

In one embodiment, assessing the semantic vector value for each of the one or more slot segments of utterance data includes: superimposing a mapping of the semantic vector value for each of the one or more slot segments of the utterance data onto a mapping of the multi-dimensional vector space for structured categories of dialogue.

In one embodiment, computing the similarity metric value includes: computing a proximity value between the semantic vector value for each of the one or more slot segments of the utterance data and each distinct category vector value for each of a plurality of distinct categories of dialogue within the multi-dimensional vector space for structured categories of dialogue; and calculating a difference between the semantic vector value and the distinct category vector value.

BRIEF DESCRIPTION OF THE FIGURES

FIG. 2 illustrates an example method in accordance with one or more embodiments of the present application;

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from user in which there are no predetermined rules designed around narrowly-defined intents. This inflexible structure cannot reasonably and efficiently address the many variances in the manners in which a user may pose a query or command to the virtual assistant.

The embodiments of the present application, however, provide an artificially intelligent machine learning-based dialogue service and/or system with natural language processing capabilities that function to process and comprehend structured and/or unstructured natural language input from a user or input from any other suitable source and correspondingly provide highly conversant responses to dialogue inputs to the system. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly-defined queries, as may be accomplished in the current state of the art.

Accordingly, the evolving nature of the artificial intelligence platform described herein therefore enables an machine learning-based virtual assistant latitude to learn without a need for additional programming and the capabilities to ingest complex (or uncontemplated) utterances and text input to provide meaningful and accurate responses.

Additionally, systems and methods are provided that enable an intelligent mapping and/or categorization of unstructured data from user input to structured categories of a machine learning-based dialogue system and service.

1. System for a Machine Learning-Based Dialogue System

Figure 1:
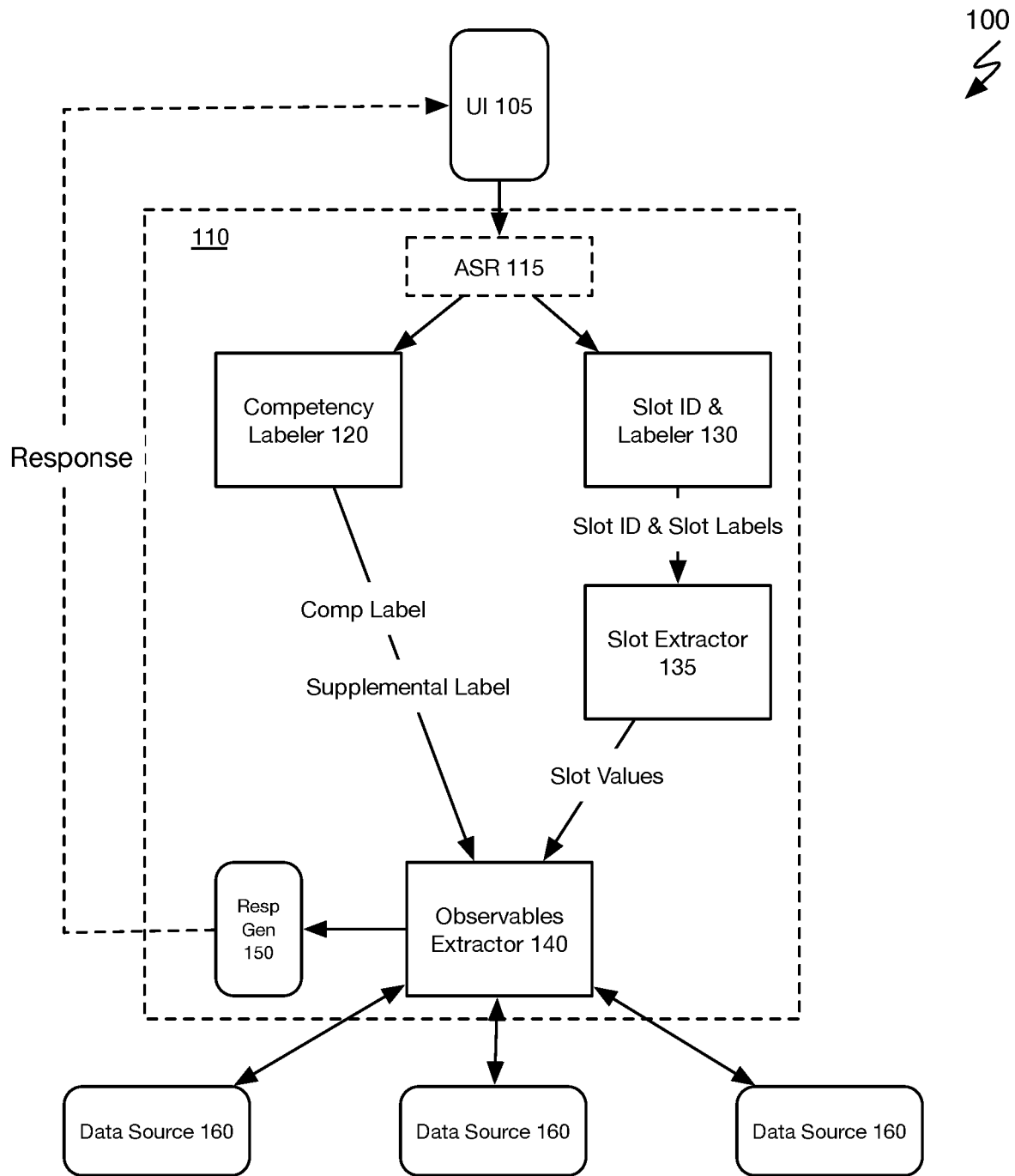
FIG. 1 illustrates a schematic representation of a system 100 in accordance with one or more embodiments of the present application.
Figure 1A:
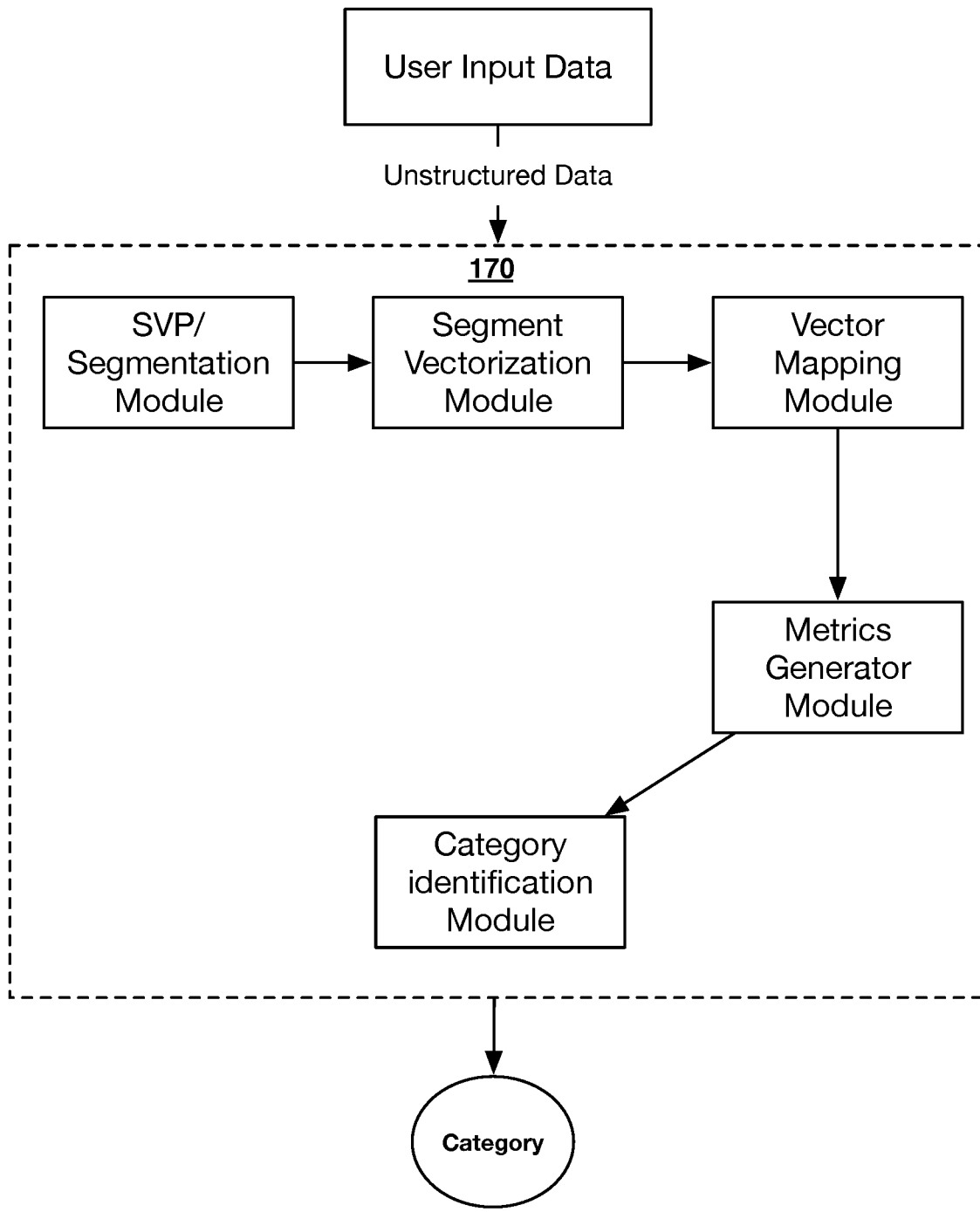
FIG. 1A illustrates a schematic representation of a sub-system 170 of system 100 in accordance with one or more embodiments of the present application.

As shown in FIG. 1, a system 100 that automatically trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140. Additionally, the system 100 may include category mapping sub-system 170 that may function to receive unstructured data in the form of user input and output a structured category for the unstructured data.

Generally, the system 100 functions to implement the artificial intelligence virtual assistant platform 110 to enable intelligent and conversational responses by an artificially intelligent virtual assistant to a user query and/or user command input into the system 100, as described in U.S. patent application Ser. Nos. 15/797,414 and 15/821,010, which are both incorporated herein in their entireties by this reference. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communication with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform 110 may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 110. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowdsourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were misspredicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label.

Additionally, the competency classification engine 120 may be implemented by one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, $C_{4.5}$, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the machine learning-based virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response templates selectable by the response generator to a subset of a larger pool of response templates to consider the variations in a query or user command identified in the slot values. The response templates may generally be a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Intelligently Identifying a Competency of a Machine Learning-Based Dialogue Service According to Semantic Meanings of Target Data of User Input As shown in FIG. 2, a method 200 for mapping unstructured data of an utterance to one of a plurality of categories includes receiving user input data S210 (identifies unstructured term), identifying one or more unstructured segments (words or phrases) using SVP (slot value extraction) (vector space) S220, mapping each extracted segment to a structured category S230 which may include generating semantic value for each extracted segment of utterance, assessing against universe of (high-dimensional space), optionally assessing semantic value against (dimensional values within) hierarchy of sub-categories, assessing a vector representation of a target segment in view of structured data vector representations S240, identifying similarity metrics for a target segment S250, and mapping an unstructured target segment of an utterance to a structured category of dialogue S260. The method 200 optionally includes converting utterance data to textual input S215.

The method 200 preferably enables a machine learning-based dialogue system to handle various unstructured and/or complex utterance input. Specifically, the method 200 improves capabilities of the dialogue system to comprehend unstructured utterance data by accurately mapping unstructured utterance data components to structured categories of dialogue of the dialogue system based primarily on the semantic meanings of the unstructured utterance data. That is, in one or more embodiments, the method 200 computes and/or identifies a semantic meaning of one or more segments of utterance data and engages a subset of machine learning capabilities of the dialogue system to properly interpret the utterance data to build an intelligent and accurate response to the utterance data. This may be distinct from traditional dialogue system that include word or term matching and other rules-based heuristic that may not use a semantic meaning of an utterance or text when handling the utterance or text.

2.1 User Input Collection and/or Identification

S210, which includes identifying and/or collecting user input data, functions to receive user input data in any suitable form. The user input data may include input that originates with or is provided by a user accessing, at least, part of a (subscriber) system (e.g., system 100) and/or a conversational service or the like implementing the method 200. For example, a subscriber of the machine learning-based dialogue service may function to implement an interface that enables its customers to interact with a machine learning-based dialogue agent, which is computatively powered by a distinct machine learning-based dialogue service to which the subscriber has a subscription to.

Preferably, the user input data may include, but is not limited to, speech or utterance input, textual input, gesture input, touch input, image input, and/or any suitable or type of input. Preferably, the user input data comprises one of (or a combination of) an utterance input and a textual input. Additionally, the user input data preferably includes a query by the user or a command from the user.

In the case that the user input data comprises textual input, S210 may function to direct the textual input directly to a natural language processing engine of a system implementing the method 200. That is, without pre-processing the textual input, the method 200 may function to initialize a natural language comprehension process to enable the system implementing the method 200 to understand the intent of the textual input from the user.

Additionally, or alternatively, in the case that the user input data comprises utterance and/or speech input data, optionally S215, which includes processing utterance data of the user input data, functions to convert verbally communicated user input data to textual input data. Accordingly, S215 may function to implement an automatic speech recognition system to which a system implementing the method 200 directs some or all utterance or speech input for processing. The automatic speech recognition system may function to collect the utterance or speech input, convert the utterance or speech input to textual input, and route the converted textual input to a natural language processing system. In such case, the system implementing the method 200 or the automatic speech recognition system may function to (simultaneously) transmit a copy of the converted textual input to each of a classification engine and a slot value identification engine of the machine learning-based dialogue service.

In a preferred embodiment, the method 200 may function to receive the user input data via a user interface accessible to or provided to the user. The user interface receiving the user input data may be implemented via any suitable computing device and/or form, including but not limited to, via a mobile computing device, via a web browser (having a website displayed therein), via a social network interface, via an automated teller machine, kiosk, wearable computing devices (e.g., smart watches, smart glasses, etc.), a vehicle (e.g., an autonomous vehicle), virtual and/or personal assistant devices (e.g., Alexa, Amazon Echo, Google Home, Cortana, Jarvis, etc.), and any system having a suitable user interface for implementing the method 200.

Additionally, or alternatively, the user interface may function to generate one or more graphical user interface objects that enable a user to interact with an artificially intelligent virtual agent of a system implementing the method 200. For example, the user interface may function to generate, via a mobile computing device or desktop computing device, an animated graphical interface object that may be capable of conversantly (verbally) or textually interacting with a user. Additionally, or alternatively, the user interface may function to generate one or more input boxes, such as text input boxes, into which a user may freely enter textual input data.

2.2 Segment Data Identification & Extraction

S220, which includes segment data identification and extraction, may function to assess user input data, using one or more machine learning classification models, and identify one or more distinct target segments of data (target segment data) for mapping and categorization. The one or more target segment data identified and/or extracted by S220 from user input data may typically include unstructured data; however, in some embodiments, target segment data may additionally or alternatively include a combination of unstructured and structured data.

In some embodiments, S220 may function to segment or parse user input data (e.g., a query or command) into target segments of unstructured data and/or operative terms that trigger one or more actions or operations by the machine learning-based dialogue service required for servicing the query or command. Accordingly, the method 200 may initially function to decompose a query or command into intelligent segments using, at least, a machine learning classifier or the like and categorize each of the segments of data to one or more structured categories associated with the machine learning-based dialogue service, as described in more detail in S230-S260.

Additionally, or alternatively, S220 may include identifying a slot classification and/or a slot classification label for each of the identified slots or target segments of the user input data. In one embodiment, S220 may function to identify a slot label having a high probability of matching a description of the data elements within a slot of the user input data. Specifically, in such embodiments, identifying a slot label preferably includes identifying a slot classification label generated using one or more slot classification machine learning models. In some embodiments, slot label classification of target segments may be implemented in combination with target segment categorization and/or in lieu of target segment categorization, as described in S230-S260.

Additionally, or alternatively, S220 may function to annotate, tag, or augment one or more of the data elements of the user input data with a slot classification label that may generally identify or implicate a predefined categorization of a data element or a combination of data elements within the user input data. The data elements of the user input data may typically relate to each term, character or group of characters, object, clip of an utterance, or some defined segment of the user input data. For example, a user may provide as text input into a system implementing the method 200, the query: "what is my balance today"; in such example, each of the terms "what", "is", "my", "balance", and "today" may be considered data elements of the user input data.

Figure 3:
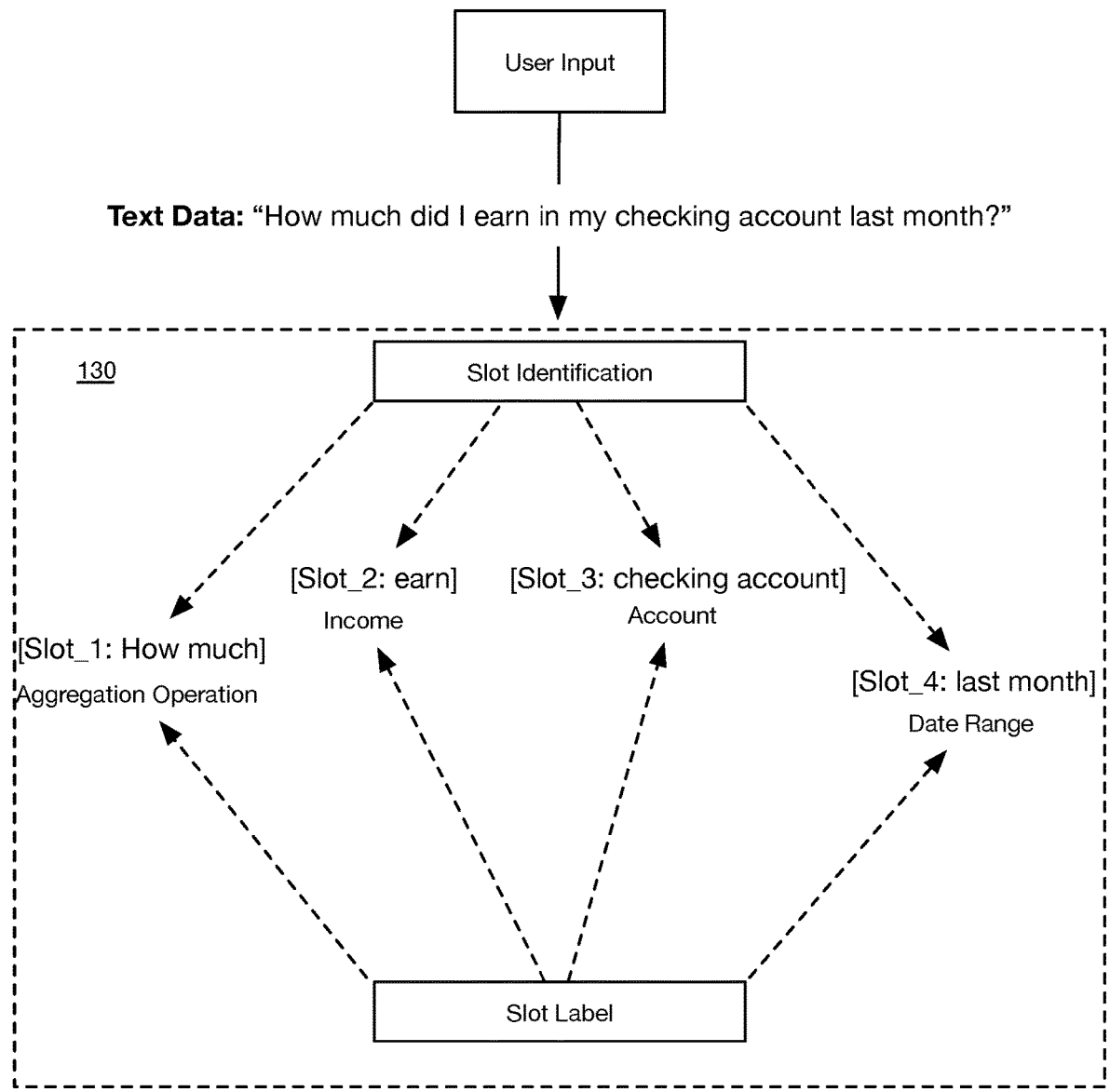
FIG. 3 illustrates an example schematic for implementing portions of a method and a system in accordance with one or more embodiments of the present application.

In some embodiments, S220 functions to partition/parse each of or a combination of the data elements of user input data into respective slots, as shown in FIG. 3. Accordingly, S220 may function to use the slot classification machine learning model to initially partition the user input data into segments or slots. Once the data elements are slotted, S220 may function to estimate or predict a slot classification label for each of the segments of the user input data. In the ensuing example, user data input may include the query: "How much did I earn in my checking account last month?" In this example, S220 may first function to segment the user input data into slots, such as "[How much] did I [earn] in my [checking account] [last month]?" As demonstrated by this example, the parsing or segmentation of the user input data may be limited to data elements that the slot classification model or the like identifies as operative or key terms within the user data input. Any non-operative data elements or terms, such as "did I" or "in my" may simply be ignored and/or removed from the user input data to form a subset of user input data only including the segmented portions with operative data elements. Using the slot classification machine learning model, S220 may function to prescribe a slot classification label to each of the slots or segments identified by the data elements that are positioned between brackets. Example slot classification labels for each of these segments may include, [How much]: Amount; [earn]: Income; [checking account]: Account; and [last month]: Date Range. A system implementing the method 200 may additionally enumerate (e.g., slot 1, slot 2 . . . slot N) each identified slot in the order that the slots appear in a user data input string.

As mentioned above, the slot classification machine learning model may be trained to identify any type and an unlimited number of slot classification labels or values for identified slots. Because the typical constraints of a rules-based approach do not apply to the slot classification machine learning model, the slot classification model may be extended to include predetermined and emerging labels. Accordingly, a technical benefit of employing the slot classification machine learning model includes an inherent flexibility of the machine learning model to extend its slot classification labeling base to include emerging slot classification labels (including those not previously known during pre-deployment training the model).

2.3 Unstructured Data Vectorization

Figure 4:
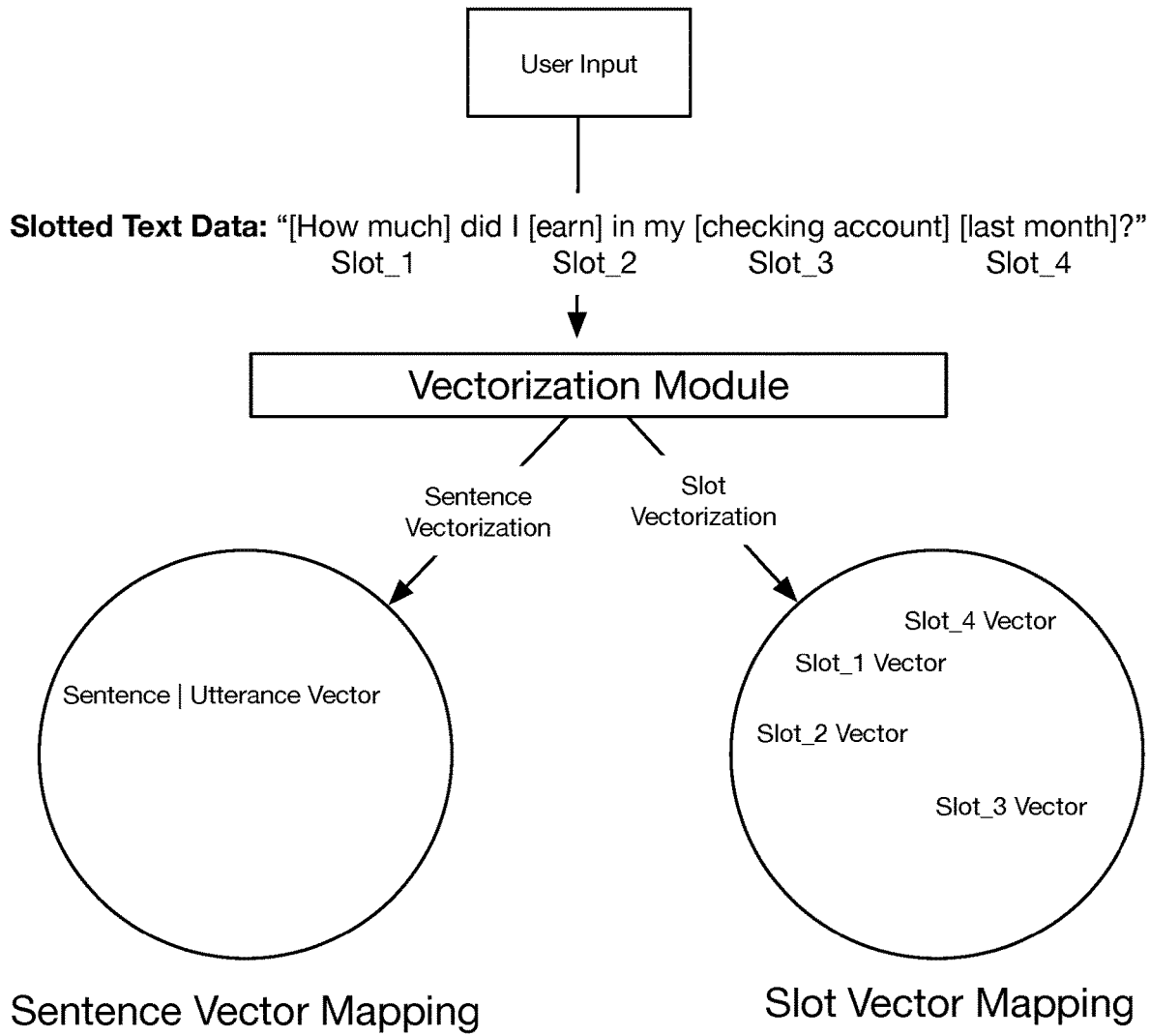
FIG. 4 illustrates an example schematic for generating vectors for segments of utterance data in accordance with one or more embodiments of the present application.

S230, which includes computing a vector representation of a target segment of user input, may function to compute a vector value for each target segment of user input (identified in S220 or the like) based at least on a semantic interpretation or semantic meaning of the target segment, as shown by way of example in FIG. 4. That is, S230 preferably functions to convert the target unstructured data segment to an unstructured data vector value that may be mapped (positioned) in high-dimensional vector space. Preferably, S230 may function to compute the vector value target segment based on contextual data surrounding the target segment (e.g., other terms, other phrases, other target segments adjacent to or in proximity of the target segment and the like), which may be used to inform and/or bound a semantic vector value for the target segment. Additionally, or alternatively, S230 may function to compute the semantic vector value for a target segment of utterance data based on a contextual environment as well as a slot classification label appended or annotated to the target segment. However, it shall be noted that S230 may function to compute a vector value for a target segment using any suitable vectorization technique including, but not limited to, the vectorization techniques outlined below.

Accordingly, in some embodiments, S230 may function to use one or more sentence embedding techniques or word embedding techniques to map a target segment into a vector space. It shall be noted that while, in such embodiments, S230 preferably functions to employ sentence embedding techniques to generate vector representations or sentence representations for a target segment, S230 may additionally or alternatively use any suitable vector mapping technique either singly or in combination with the word or sentence embedding technique.

In a first implementation, S230 may function to implement a sentence embedding technique including a universal sentence encoder (USE), such as a Deep Averaging Network method, which functions to average word embeddings of a target input of textual data and passes the resultant averages through a feedforward network or the like to generate a vector representation for each target segment of user input. Preferably, the USE may be trained using a range of supervised and unsupervised tasks.

In a second implementation, S230 may function to implement a sentence embedding technique including a smooth inverse frequency (SIF). Using the SIF technique, S230 may function to compute a weighted average of word embeddings for each target segment of user input. In this second implementation, the weighted average for each target segment of user input may be determined based on a word frequency.

In a third implementation, S230 may function to implement as a sentence embedding technique a simple average of word embeddings. That is, S230 may function to compute an unweighted average of word embeddings that preferably does not allow for preferential weightings based on one or more characteristics of a target segment.

It shall be noted that while the method 200 may function to implement S230 with any one of the above-identified word and/or sentence embedding techniques, the method 200 may function to apply any combination of the above when executing S230 or any suitable or known sentence and/or word embedding techniques that may function to convert utterance data into a vector representation or vector value. That is, in some embodiments, the method 200 may function to use multiple sentence embedding techniques or other data vectorization techniques to generate multiple distinct vector values for each target segment of user input.

2.4 High-Dimensionality Vector Assessment

S240, which includes assessing a vector representation of a target segment in view of structured data vector representations, may function to evaluate a computed vector value for a target segment of utterance data against a structured multi-dimensional space that includes vector representations of structured data and/or structured categories of dialogue (of a natural language processing system or the like).

Preferably, the structured multi-dimensional space may be associated with and/or generated by a dialogue system of a machine learning-based conversational service or the like. In some embodiments, each distinct structured vector representation of the structured multi-dimensional space preferably represents one distinct category or distinct domain of dialogue into which a user's input or unstructured utterance data may be mapped and/or processed through when executing a classification task by or through the machine learning-based conversational service responsive to the user input. Accordingly, in some embodiments, each structured category of dialogue represented within the structured multi-dimensional space may be associated with a distinct set of trained machine learning models that predict classifications or labels or make inferences that are specific to a respective category of dialogue. Accordingly, in such embodiments, each distinct structured category of dialogue may be associated and/or linked to a group of distinct trained machine learning models for handling utterance data having a dialogue intent that is within a scope of a respective distinct structured category of dialogue. Thus, in such embodiments, a target segment of utterance data that may be mapped, based on the assessment, to one distinct structured category of dialogue may be directed or passed to one or more machine learning models that are linked to the one distinct structured category of dialogue.

Additionally, or alternatively, in some embodiments, a plurality of distinct categories defining a structured category set for a given competency or dialogue intent may be configured or built in a limited state, such that the list of distinct categories defining the structured category set may not include sufficient semantic variations of each distinct category to enable accurate classification and/or mapping of target segments. In such embodiments, the machine learning-based service may function to augment the multi-dimensional structured space to include variations of the distinct categories including synonyms and/or various categories, terms, and/or phrases having similar meanings or similar semantic values like a subject distinct category.

Figure 5:
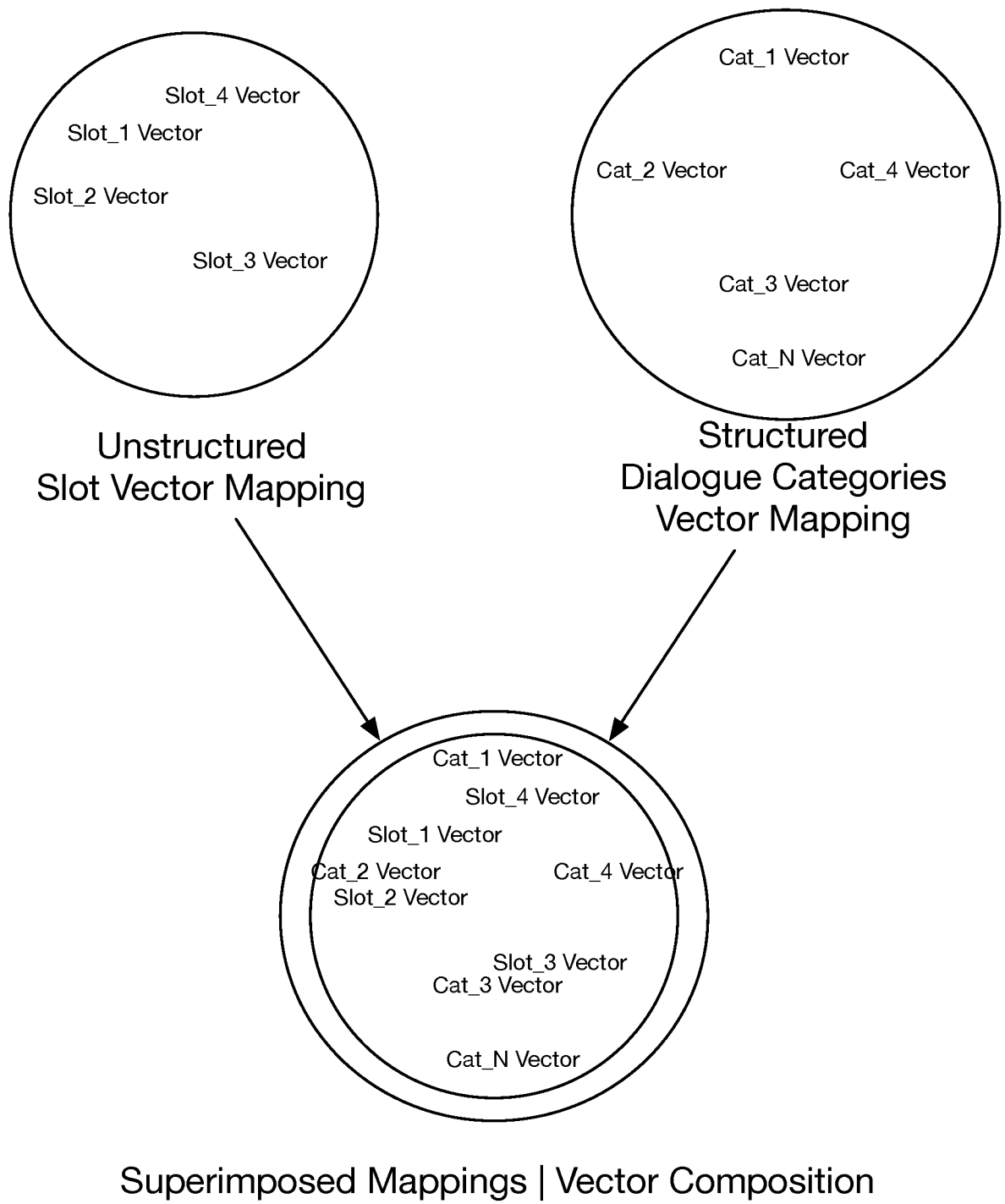
FIG. 5 illustrates an example schematic for generating an integrated mapping of unstructured vector values and structured vector values in accordance with one or more embodiments of the present application.

In a first implementation, S240 may function to assess a vector representation of a target segment of utterance data by superimposing a mapping of the structured multi-dimensional space of structured categories of dialogue onto a mapping of the unstructured high-dimensional space that includes the vector representation(s) of the target segment of utterance data, as shown by way of example in FIG. 5. In such embodiments in which the mapping of the structured multi-dimensional space and the mapping of the unstructured high-dimensional space are blended or joined in an overlapping state (e.g., a composition of two distinct mappings), S240 may function to assess a proximity and/or intersection of the vector of the target segment relative to each of the vector representations of each of the structured categories or domains of dialogue of the structured multi-dimensional space.

In a variant of this first implementation, S240 may function to superimpose the vector representation of the target segment onto a mapping of the structured multi-dimensional space. In this variant, S240 may function to extract the vector representation of the target segment from the unstructured high-dimensional space and map the vector of the target segment directly onto the mapping of the structured multi-dimensional space. In this way, only the vector of the target segment may be observed and/or considered in view of the vector representations of the structured categories thereby reducing noise of other vector values within the unstructured high-dimensional space.

In a further variant, in some embodiments, the vector representations for each of the structured categories and/or structured domains of the machine learning-based conversational service may be integrated into the mapping of the unstructured high-dimensional space. In this way, the integrated high-dimensional space includes a single, integrated mapping having vector values for unstructured data and structured data (e.g., structured categories, etc.).

In yet a further variant, S240 may function to implement a pairwise assessment between each vector of a distinct target segment of utterance data and each distinct structure category of dialogue of the high-dimensional space of structure categories of dialogue. In this further variant, S240 may function to define each of a plurality of distinct pairwise pairings of a vector of a target segment of utterance data and a vector of a distinct structured category of dialogue to determine which of the plurality of distinct pairwise pairings of the target segment of utterance data is the most optimal pairing, as determined in S250, in some embodiments. Preferably, a pairwise pairing having a closest value between the vector of the target segment of utterance data and the vector of one distinct structured category of dialogue may define the most optimal pairing.

2.5 Proximity-Based Similarity Metric

S250, which includes identifying similarity metrics for a target segment, may function to generate or identify one or more similarity metrics based on one or more computed proximities between the vector of the target segment of utterance data and each of the vector values of the distinct categories of dialogue within the structured multi-dimensional space.

Accordingly, the computed proximity or computed distance value between the vector of the target segment and each category instance or vector instance within the structured multi-dimensional space may represent an amount of similarity or dissimilarity between a given category instance and the target segment. For instance, the greater the computed distance value between the vector of the target segment and a vector of a given category instance may indicate that the target segment may be less similar (or more likely to have a different semantic meaning than) to the given category instance. Conversely, the lower the computed distance value between the vector of the target segment and a given category instance may indicate that the target segment may be more similar (or more likely to have a same or similar meaning than) to the given category instance. An exception may include anomalous or outlier instances, as described in U.S. patent application Ser. No. 16/689,287, which is incorporated herein in its entirety by this reference, of a target segment that may have large distance values from a given category instance but that generally shares a common semantic meaning or interpretation as one or more distinct category instances with the high-dimensional space.

Accordingly, S250 may function to compute a higher similarity metric value between a pairing of the vector of a target segment and a vector of a first category instance based on a close proximity value (e.g., low computed distance value) relative to a pairing of the vector of the target segment and a vector of a second category instance having a distant proximity to each other and consequently, a higher computed distance value.

In some embodiments, S250 may function to compute a proximity or distance value for each distinct pairing of the vector of the target segment and each of the vectors of the structured categories of the structured multi-dimensional space. Similarly, S250 may function to compute a similarity metric value for each distinct pairing based on the computed proximity value for a given pairing. Additionally, or alternatively, S250 may function to store each computed similarity metric value in association with the pairing of the vector of the target segment and the vector of the distinct category instance from which the computed similarly metric value was derived. In some embodiments, S250 may additionally function to augment the superimposed or integrated mappings with the computed similarity metric values. In such embodiments, S250 may function to annotate the integrated mappings with the most optimal or closest similarity metric value. Preferably, the annotation may be added or connected to the target segment of utterance data under evaluation. The annotation may include an indication of which one of the structured categories of dialogue and the computed similarity metric.

Optionally, S255, which includes enumerating each similarity metric value of each distinct vector pairing, may function to organize each distinct vector pairing based on an associated computed similarity metric value of the vector pairing. That is, in a preferred embodiment, S255 may function to rank or otherwise, generate a listing of the distinct vector pairings that produces an ordering based on the computed similarity metric values (or the computed distance value between the vector values of each pairing).

In one embodiment, S255 may function to rank each vector pairing based on respective similarity metric values in an ascending manner, such that the vector pairings having relatively smaller distance values (or greater similarities) than subsequently listed or ordered vector pairings appear in a higher order (i.e., more highly ranked) than the vector pairings with relatively larger distance values (or greater dissimilarities). In this way, the vector pairings having smaller distances or a small computed disparity in vector values may be listed or ordered towards and/or at the top of the ordering (or listing). Thus, with mere visual inspection of the top of the ordering, it may be gleaned which of the structured categories of the structured multi-dimensional space share or have a similar meaning to the target segment.

Alternatively, in some implementations, S255 may function to rank vector pairings based on their respective similarity metric values in a descending manner, such that the vector pairings having relatively larger distance values than subsequently listed or ordered vector pairings appear in a higher order than the vector pairings with relatively smaller distance values.

It shall be noted that S255 may function to organize, enumerate, or list the vector pairings in any suitable manner for purposes of distinguishing between vector pairings with relatively greater and relatively lesser distance values.

Additionally, or alternatively, in some embodiments, a minimum similarity metric value threshold (similarity threshold) may be applied to an ordered and/or unordered mapping or listing of the vector pairings. Accordingly, S250 may function to identify a subset structured categories from the structure multi-dimensional space as prospective mapping candidates. For example, a minimum similarity threshold may be set to require an 80% similarity between a target segment vector and a category vector in a vector pairing. In such example, if the structured multi-dimensional space includes 100 distinct structured categories but only 3 of the 100 categories (in vector pairings) have a similarity metric value that satisfy or exceed the 80% similarity threshold, S250 may function to identify the 3 distinct categories as candidates for mapping the target segment thereto.

Figure 6:
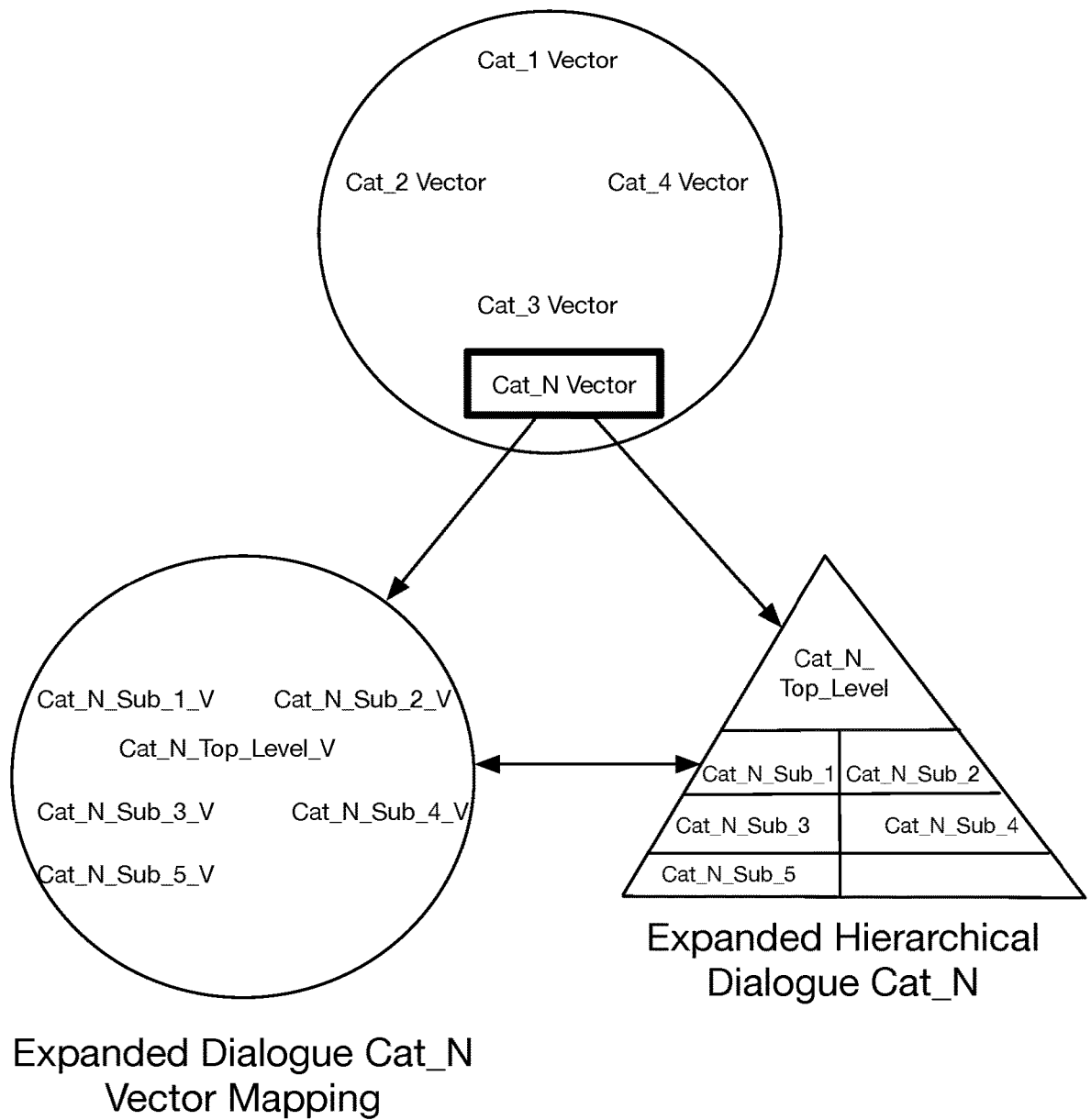
FIG. 6 illustrates an example schematic of an expanded category of dialogue that includes a vector mapping and hierarchical representation of the expanded category in accordance with one or more embodiments of the present application.

Additionally, or alternatively, in some embodiments, one or more of the distinct structured categories within the structured multi-dimensional space may have a hierarchical structure with one or more sub-categories (e.g., an expanded hierarchical structure) below a top-level category, as shown by way of example in FIG. 6. In such embodiments, a vector representation of the top-level category having a hierarchical structure may be mapped to the structured multi-dimensional space and vector representations or vector values for each of the subcategories of the hierarchical structure may be represented in a secondary vector mapping that includes all vector values of the sub-categories. In one variant, vector values for the sub-categories within the hierarchical structure may be accessed by expanding the top-level category, preferably, while exploring the top-level category as a mapping candidate.

In such embodiments, S240 and S250 may function to assess the vector representation of a target segment against each of the vector representations of sub-categories within a hierarchical structure of a top-level category within the structured multi-dimensional mapping. Accordingly, a similarity metric value may be computed between each pairing of the vector of the target segment and each distinct sub-category of the hierarchical structure of a top-level category. In some embodiments, S250 may function to determine a similarity metric average for a given hierarchical structure of a top-level category by summing all computed similarity metric values of the hierarchical structure and dividing the sum by the number of computed similarity metric values.

Additionally, or alternatively, S250 may function to compute a weighted average of the computed similarity metric values of the hierarchical structure. In such embodiments, each distinct sub-category within the hierarchical structure may have a distinct weight associated therewith. For instance, sub-categories nearest (in order) to the top-level category may have a greater weight associated therewith (the converse may also be implemented in some instances).

2.6 Mapping Based on Hierarchy Assessment

S260, which includes mapping the target segment to a structured category, may function to map the target segment to one of a plurality of distinct structured categories of a machine learning-based conversational service based at least on an assessment of a similarity metric value between the target segment and each of the structured categories of the structured multi-dimensional space.

In one embodiment, S260 may function to identify, as a mapping target for the target segment, a top-level structured category having a highest computed similarity metric value based on a vector pairing between the vector value of the target segment and the vector value of the top-level category.

In a preferred embodiment, S260 may function to identify as a mapping target, a hierarchical structure of a top-level category having a highest (average or weighted average) computed similarity metric value based on vector pairings between the vector value of the target segment and each vector value of the sub-categories of the hierarchical structure.

Accordingly, S260 may function to map the target segment to at least one structured category of the machine learning-based conversational service based at least on a computed similarity metric value and responsively, perform one or more tasks using one or more response generating features or tools associated with the structured category/competency, as described by way of example in U.S. patent application Ser. No. 15/797,414 and U.S. Pat. No. 10,572,801, which are both incorporated herein in their entireties by this reference.

Accordingly, a machine learning-based dialogue or conversational service implementing at least part of the method 200 may function implement one or more natural language processing techniques based on the structured category to which the target segment may be mapped and based on the target segment, per se, to perform one or more tasks responsive to the user input.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method for building a response for a machine learning-based dialogue agent based on mapping unstructured data of an utterance to distinct categories of dialogue, the method comprising:
    identifying utterance data comprising a verbal communication or a textual communication to a machine learning-based dialogue agent;
    implementing one or more machine learning classifiers that:
        (i) predict one or more slot segments of the utterance data based on an input of the utterance data;
        (ii) predict a slot classification label for each of the one or more slot segments of the utterance data;
    computing a semantic vector value for each of the one or more slot segments of the utterance data;
    assessing the semantic vector value of the one or more slot segments of the utterance data against a multi-dimensional vector space of structured categories of dialogue, wherein:
        the multi-dimensional vector space comprises vector values for a plurality of distinct structured categories of dialogue, each of the plurality of distinct structured categories of dialogue having an expanded hierarchical structure,
        the expanded hierarchical structure of each of the plurality of distinct structured categories of dialogue includes:
            (a) a distinct top-level category having a distinct top-level vector value and
            (b) one or more distinct sub-categories of dialogue having one or more distinct sub-category vector values, wherein the one or more sub-categories of dialogue are subordinate to the distinct top-level category of dialogue and define categories of dialogue with a narrower scope of semantic meaning than the distinct top-level category of dialogue;
    wherein the assessment includes:
        (i) evaluating the semantic vector value for each of the one or more slot segments of the utterance data against each of the distinct top-level category;
        (ii) computing a first similarity metric value for each pairing of the one or more slot segments of the utterance data and each distinct top-level category based on the evaluation;
        (iii) selectively evaluating the semantic vector value for each of the one or more slot segments of the utterance data against the one or more distinct sub-categories of dialogue of one or more expanded hierarchical structures of the plurality of distinct structured categories of dialogue based on the computed first similarity metric value for each pairing;
        (iv) computing a second similarity metric value for each pairing of the one or more slot segments of the utterance data and each of the one or more distinct sub-categories of dialogue of a given expanded hierarchical structure;
        (v) computing an average similarity metric value for each the plurality of distinct structured categories of dialogue based on a sum of the first similarity metric value for each distinct top-level category and the second similarity metric value of the given expanded hierarchical structure;
    selecting one structured category of dialogue from the plurality of distinct structured categories of dialogue based on the computed average similarity metric value for each of the plurality of distinct structured categories of dialogue of the multi-dimensional vector space; and
    producing a response to the utterance data that is communicated via the machine learning-based dialogue agent based at least on the selected one structured category of dialogue.

2. The method according to claim 1, wherein
the multi-dimensional vector space of structured categories of dialogue includes a distinct category vector value for each of the plurality of distinct structured categories of dialogue.

3. The method according to claim 1, wherein
computing the semantic vector value for each of the one or more slot segments of the utterance data includes:
    applying a trained universal sentence encoder that averages word embeddings of each of the one or more slot segments and passes the averages through a feedforward network.

4. The method according to claim 1, wherein
computing the semantic vector value for each of the one or more slot segments of the utterance data includes:
    applying a smooth inverse frequency that computes a weighted average of word embeddings of each of the one or more slot segments.

5. The method according to claim 1, wherein
computing the semantic vector value for each of the one or more slot segments of the utterance data includes:
    computing an unweighted average of word embeddings for each of the one or more slot segments.

6. The method according to claim 1, wherein
assessing the semantic vector value for each of the one or more slot segments of utterance data includes:
    superimposing a mapping of the semantic vector value for each of the one or more slot segments of the utterance data onto a mapping of the multi-dimensional vector space having at least the distinct top-level vector value for each of the plurality of distinct structured categories of dialogue within the multi-dimensional vector space.

7. The method according to claim 1, wherein assessing the semantic vector value for each of the one or more slot segments of utterance data includes:
   superimposing the semantic vector value for each of the one or more slot segments of the utterance data onto a mapping of the multi-dimensional vector space having at least the distinct top-level vector value for each of the plurality of distinct structured categories of dialogue within the multi-dimensional vector space.

8. The method according to claim 1, wherein computing the similarity metric value includes:
   computing a proximity value between the semantic vector value for each of
      the one or more slot segments of the utterance data and the distinct top-level vector value of each of the plurality of distinct categories of dialogue within the multi-dimensional vector space for structured categories of dialogue.

9. The method according to claim 8, wherein computing the proximity value includes:
   calculating a difference between the semantic vector value and the distinct top-level vector value.

10. The method according to claim 9, wherein selecting the one structured category of dialogue from the plurality of distinct structured categories of dialogue includes:
   identifying the one structured category having the computed similarity metric value that includes a smallest difference between the semantic vector value and the distinct top-level vector value.

11. The method according to claim 2, wherein computing the similarity metric value includes:
   defining a plurality of distinct pairwise of vector values, wherein each of the plurality of distinct pairwise of vector values includes a pairing between (a) the semantic value for each of the one or more slot segments of the utterance data and (b) the distinct top-level vector value of each one of the plurality of distinct structured categories of dialogue within the multi-dimensional vector space for structured categories of dialogue; and
   calculating a difference in vector values within each of the plurality of distinct pairwise of vector values, wherein the similarity metric value of the utterance data comprises the difference.

12. The method according to claim 11, wherein selecting the one structured category of dialogue from the plurality of distinct structured categories of dialogue includes:
   identifying the one structured category having the computed similarity metric value that includes a smallest difference in vector values in a given pairwise of vector values.

13. A system for mapping unstructured data of an utterance to one or more of a plurality of distinct categories, the system comprising:
   a machine learning-based automated dialogue service implemented by one or more hardware computing servers that:
      identify utterance data comprising a verbal communication and/or a textual communication to a machine learning-based dialogue agent;
      implement one or more machine learning classifiers that:
         (i) predict one or more slot segments of the utterance data based on an input of the utterance data;
         (ii) predict a slot classification label for each of the one or more slot segments of the utterance data;
      compute a semantic vector value for each of the one or more slot segments of the utterance data;
      assess the semantic vector value of the one or more slot segments of the utterance data against a multi-dimensional vector space of structured categories of dialogue,
   wherein:
      the multi-dimensional vector space comprises vector values for a plurality of distinct structured categories of dialogue, each of the plurality of distinct structured categories of dialogue having an expanded hierarchical structure,
      the expanded hierarchical structure of each of the plurality of distinct structured categories of dialogue includes:
         (a) a distinct top-level category having a distinct top-level vector value and
         (b) one or more distinct sub-categories of dialogue having one or more distinct sub-category vector values, wherein the one or more sub-categories of dialogue are subordinate to the distinct top-level category of dialogue and define categories of dialogue with a narrower scope of semantic meaning than the distinct top-level category of dialogue;
   wherein the assessment includes:
      (i) evaluating the semantic vector value for each of the one or more slot segments of the utterance data against each of the distinct top-level category;
      (ii) computing a first similarity metric value for each pairing of the one or more slot segments of the utterance data and each distinct top-level category based on the evaluation;
      (iii) selectively evaluating the semantic vector value for each of the one or more slot segments of the utterance data against the one or more distinct sub-categories of dialogue of one or more expanded hierarchical structures of the plurality of distinct structured categories of dialogue based on the computed first similarity metric value for each pairing;
      (iv) computing a second similarity metric value for each pairing of the one or more slot segments of the utterance data and each of the one or more distinct sub-categories of dialogue of a given expanded hierarchical structure;
      (v) computing an average similarity metric value for each the plurality of distinct structured categories of dialogue based on a sum of the first similarity metric value for each distinct top-level category and the second similarity metric value of the given expanded hierarchical structure;
      select one structured category of dialogue from the plurality of distinct structured categories of dialogue based on the computed average similarity metric value for each of the plurality of distinct structured categories of dialogue of the multi-dimensional vector space; and
      produce a response to the utterance data that is communicated via the machine learning-based dialogue agent based at least on the selected one structured category of dialogue.

14. The system according to claim 13, wherein assessing the semantic vector value for each of the one or more slot segments of utterance data includes:
- superimposing a mapping of the semantic vector value for each of the one or more slot segments of the utterance data onto a mapping of the multi-dimensional vector space having at least the distinct top-level vector value for each of the plurality of distinct structured categories of dialogue.

15. The system according to claim 14, wherein computing the similarity metric value includes:
- computing a proximity value between the semantic vector value for each of the one or more slot segments of the utterance data and each distinct category vector value for each of a plurality of distinct categories of dialogue within the multi-dimensional vector space having at least the distinct top-level vector value for each of the plurality of structured categories of dialogue; and
- calculating a difference between the semantic vector value and the distinct top-level vector value.

* * * * *